United States Patent
Ito et al.

(10) Patent No.: US 12,491,793 B2
(45) Date of Patent: Dec. 9, 2025

(54) CONTROL DEVICE

(71) Applicant: TOYOTA JIDOSHA KABUSHIKI KAISHA, Toyota (JP)

(72) Inventors: Tomoki Ito, Toyota (JP); Yuki Sugo, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/829,549

(22) Filed: Sep. 10, 2024

(65) Prior Publication Data

US 2025/0206185 A1    Jun. 26, 2025

(30) Foreign Application Priority Data

Dec. 25, 2023  (JP) .................................. 2023-218359

(51) Int. Cl.
| | |
|---|---|
| *B60L 58/12* | (2019.01) |
| *B60L 58/18* | (2019.01) |
| *H01M 10/42* | (2006.01) |
| *H01M 10/48* | (2006.01) |
| *B60L 1/00* | (2006.01) |

(52) U.S. Cl.
CPC .............. *B60L 58/12* (2019.02); *B60L 58/18* (2019.02); *H01M 10/425* (2013.01); *H01M 10/48* (2013.01); *B60L 1/00* (2013.01); *H01M 2220/20* (2013.01)

(58) Field of Classification Search
CPC ............ B60L 58/12; B60L 58/18; B60L 1/00; H01M 10/425; H01M 10/48; H01M 2220/20
USPC ......................................................... 307/10.1
See application file for complete search history.

(56) References Cited

U.S. PATENT DOCUMENTS

| | | | | |
|---|---|---|---|---|
| 2015/0084639 A1* | 3/2015 | Joe | ..................... | G01R 31/3842 324/426 |
| 2018/0024199 A1* | 1/2018 | Lee | ..................... | G01R 31/3842 702/63 |

FOREIGN PATENT DOCUMENTS

JP           2023-059430 A      4/2023

* cited by examiner

*Primary Examiner* — Rexford N Barnie
*Assistant Examiner* — Swarna N Chowdhuri
(74) *Attorney, Agent, or Firm* — SoraIP, Inc.

(57) ABSTRACT

The control device includes a control unit that controls power supply from a main battery of the vehicle to a sub battery, and a calculation unit that calculates an estimated value of a full charge capacity of the main battery. When the error between the full charge capacity and the estimated value is larger than the predetermined value, the control unit calculates a power supply duration in which the power supply of the sub-battery to the load continues while the power supply is stopped, and a required time for eliminating the polarization of the main battery, and stops the power supply when the power supply duration is equal to or longer than the required time. The calculation unit calculates a voltage after a required time has elapsed since the power supply is stopped. After the voltage is calculated, the control unit resumes the power supply.

7 Claims, 6 Drawing Sheets

CONTROL DEVICE

CROSS-REFERENCE TO RELATED APPLICATION

This application claims priority to Japanese Patent Application No. 2023-218359 filed on Dec. 25, 2023, incorporated herein by reference in its entirety.

BACKGROUND

1. Technical Field

The present disclosure relates to a control device.

2. Description of Related Art

In regard to a control device for an in-vehicle battery, Japanese Unexamined Patent Application Publication No. 2023-59430 (JP 2023-59430 A) describes a point that power is pumped from a main battery to an auxiliary battery, for example. If the power pumping is performed during parting, for example, power can be stably supplied from the auxiliary battery to an auxiliary device such as a drive recorder, and it is thus possible to improve convenience.

Further, the control device monitors a degradation state of the main battery by estimating full charge capacity of the main battery. The full charge capacity can be estimated from an open circuit voltage (OCV) of the main battery.

SUMMARY

However, since the auxiliary battery is connected as a load to the main battery during execution of the power pumping, the control device cannot measure the OCV with high accuracy. On the other hand, if the OCV is measured after the power pumping ends, the frequency of estimating the full charge capacity becomes insufficient, and there is thus a concern that accuracy of the estimation may be lowered. Therefore, it is difficult to estimate the full charge capacity of the main battery in a timely manner and to monitor the degradation state with high accuracy during the execution of the power pumping.

Thus, the present disclosure was made in view of the above problems, and an object of the present disclosure is to provide a control device capable of monitoring a degradation state of a main battery with high accuracy during execution of power pumping.

A control device according to the present disclosure includes:
  a control unit that controls power supply from a main battery of a power source of a vehicle to a sub-battery that supplies power to a load mounted in the vehicle during parking; and a calculation unit that calculates an estimated value of full charge capacity of the main battery from a voltage of the main battery,
  in which the control unit calculates a power supply duration during which the power supply of the sub-battery to the load is continued during stopping of the power supply and a time required to solve polarization of the main battery when an error between the full charge capacity and the estimated value is greater than a predetermined value, and stops the power supply when the power supply duration is equal to or greater than the required time, the calculation unit calculates the voltage after the required time elapses after the power supply is stopped, and the control unit restarts the power supply after the voltage is calculated.

Another control device according to the present disclosure includes:
  a control unit that controls power supply from a main battery of a power source of a vehicle to a sub-battery that supplies power to a load mounted in the vehicle during parking; and a calculation unit that calculates an estimated value of full charge capacity of the main battery from a voltage of the main battery,
  in which the control unit calculates a power supply duration during which the power supply of the sub-battery to the load is continued when the power supply is limited to specific power and a time required by an amount of polarization of the main battery to converge to a predetermined amount through the limitation of the power supply when an error between the full charge capacity and the estimated value is greater than a predetermined value, and limits the power supply to the specific power when the power supply duration is equal to or greater than the required time,
  the calculation unit calculates the voltage after the required time elapses after the power supply is limited, and
  the control unit releases the limitation of the power supply after the voltage is calculated.

In the control device described above,
  the control unit may determine whether or not the error is greater than the predetermined value using an elapse time from a latest clock time at which the estimated value is calculated based on a correlation between a utilization time of the main battery and the full charge capacity.

In the control device described above,
  the calculation unit may calculate the voltage from an internal resistance value and a closed circuit voltage of the main battery after the required time elapses after the power supply is limited.

In the control device described above,
  the load may be a drive recorder that is mounted in the vehicle.

According to the present disclosure, it is possible to monitor a degradation state of the main battery with high accuracy during execution of power pumping.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

System Configuration of the First Embodiment

Figure 1:
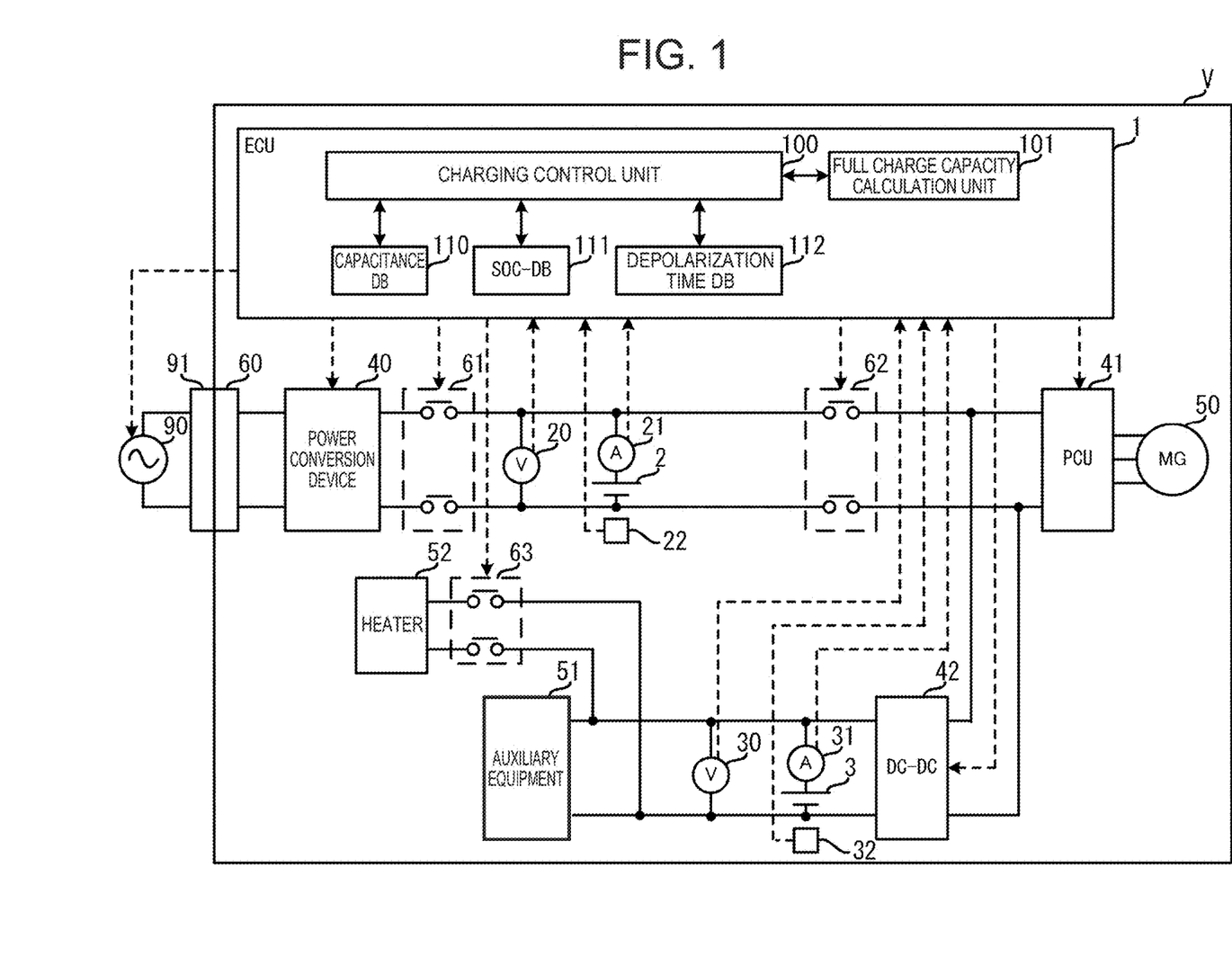
FIG. 1 is a configuration diagram illustrating an example of a system of a vehicle according to a first embodiment.

FIG. 1 is a configuration diagram illustrating an example of a system of a vehicle V according to a first embodiment. The vehicle V includes electronic control unit (ECU) 1, a main battery 2, an auxiliary battery 3, voltage sensors 20 and 30, current sensors 21 and 31, temperature sensors 22 and 32, an electric motor (MG) 50, an auxiliary machine 51, and heaters 52. Vehicle V includes power converter 40, power control unit (PCU) 41, direct current (DC) to DC converter (DC-DC converter) 42, inlet 60, and relays 61 to 63.

The vehicles V are, for example, plug-in hybrid electric vehicle (PHV) or electrified vehicle, and travel using the electric motor 50 as a power source. The electric motor 50 is driven by power supply from the main battery 2. The main battery 2 is, for example, a lithium ion battery, but is not limited thereto, and may be another storage battery.

The current sensor 21 detects a current value of the main battery 2. The voltage sensor 20 detects a voltage value of the main battery 2. The temperature sensor 22 detects the temperature of the main battery 2. The voltage-sensor 20, the current-sensor 21, and the temperature-sensor 22 output the detected values to ECU 1.

The main battery 2 is charged by a charging facility 90 outside the vehicle V. When the main battery 2 is charged, the connector 91 of the charging facility 90 is connected to the inlet 60. Charging facility 90 can be controlled on and off from ECU 1. The inlet 60, the power converter 40, the relay 61, the main battery 2, the relay 62, PCU 41, and the electric motor 50 are connected in this order.

The power converter 40 converts AC power supplied from the charging facility 90 into DC power. Although not shown, the power converter 40 includes, for example, a filtering circuit, a power factor correction (PFC) circuit, a smoothing capacitor, and a DC-DC converter. The filter circuit removes noise included in the AC power received by the inlet 60. PFC circuit boosts the AC power that has been noise-removed by the filter circuit while rectifying the AC power, and outputs the boosted AC power to a smoothing capacitor, thereby improving the power factor by bringing the input current close to a sine wave. The smoothing capacitor smoothes the variation of the DC power from PFC circuitry. DC-DC converter converts the voltage of the DC power smoothed by the smoothing capacitor into a voltage suitable for charging the main battery 2. Note that the operation of the power converter 40 can be controlled on/off from ECU 1.

The relay 61 is electrically connected between the power converter 40 and the main battery 2. The relays 61 are opened and closed under the control of ECU 1. ECU 1 can supply the DC power from the power converter 40 to the main battery 2 by closing the relays 61.

PCU 41 converts electric power between the main battery 2 and the electric motor 50 in accordance with control from ECU 1. PCU 41 includes an inverter that converts a DC current into an AC current corresponding to the electric motor 50, and a converter that adjusts the level of the DC voltage supplied to the inverter.

The relay 62 is a system main relay. The relays 62 are electrically connected between the main battery 2 and PCU 41. The relays 62 are opened and closed under the control of ECU 1. ECU 1 causes the electric motor 50 to be driven by supplying the electric power of the main battery 2 to PCU 41 by closing the relays 62 when the vehicles V are traveling.

The auxiliary battery 3 is an example of a sub-battery. The auxiliary battery 3 is, for example, a storage battery such as a lithium ion battery. The auxiliary battery 3 supplies electric power to the auxiliary machine 51 and the heater 52.

The current sensor 31 detects a current value of the auxiliary battery 3. The voltage sensor 30 detects a voltage value of the auxiliary battery 3. The temperature sensor 32 detects the temperature of the auxiliary battery 3. The voltage-sensor 30, the current-sensor 31, and the temperature-sensor 32 output the detected values to ECU 1.

The auxiliary machine 51 is an example of the load of the auxiliary battery 3, and is, for example, an audio, a car navigation system, a drive recorder, or the like. The heater 52 is connected to the auxiliary battery 3 via a relay 63. The relays 63 are opened and closed under the control of ECU 1. ECU 1 heats the main battery 2 by heating the heaters 52 by closing the relays 63.

DC-DC converters 42 are electrically connected between the auxiliary battery 3 and the relays 62 and PCU 41. DC-DC converters 42 convert electric power from the main battery 2 into electric power and provide the electric power to the auxiliary battery 3. ECU 1 drives DC-DC converter 42 by outputting pulse width modulation (PWM) to DC-DC converter 42. As a result, electric power is supplied from the main battery 2 to the auxiliary battery 3, and the auxiliary battery 3 is charged.

In this way, power pumping from the main battery 2 to the auxiliary battery 3 is executed in accordance with the control of ECU 1. Note that power pumping is an example of power supply from the main battery 2 to the auxiliary battery 3.

ECU 1 performs power pumping when the vehicles V are parked or stopped. As a result, the auxiliary machine 51 can operate even when parked or stopped. For example, when the drive recorder is operated, the surroundings of the vehicle V can be monitored by the camera device, which improves convenience.

ECU 1 is an exemplary control device. ECU 1 are computers that include Central Processing Unit (CPU), Read Only Memory (ROM), and Random Access Memory (RAM). ECU 1 operates CPU according to the program stored in ROM. ECU 1 not only performs charge-control and discharge-control of the main battery 2, for example, but also monitors degradation of the main battery 2.

ECU 1 has a charge control unit 100 and a full charge capacity calculation unit 101 as software functions. ECU 1 also includes a capacity DB 110, a State Of Charge (SOC) database 111, and a depolarization-time database 112 stored in a storage device, such as a non-volatile memory.

The charge control unit 100 is an example of a control unit. The charge control unit 100 controls power pumping from the main battery 2 to the auxiliary battery 3. The charge control unit 100 performs power pumping by, for example, turning on the relay 62 at the time of parking or stopping, stopping the operation of PCU 41, and driving DC-DC converters 42.

The full charge capacity calculation unit 101 is an example of a calculation unit. The full charge capacity calculation unit 101 calculates an estimate of the full charge capacity from the open-circuit voltage (OCV) of the main battery 2. OCV is an exemplary voltage of the main battery 2. The full charge capacity calculation unit 101 monitors the deterioration state of the main battery 2 according to the estimated value, for example, based on the correlation between the full charge capacity and the deterioration degree of the main battery 2. The monitoring result is used, for example, to notify the replacement time of the main battery 2.

The charge control unit 100 performs power pumping during parking of the vehicle V, and stops power pumping when a predetermined condition is satisfied. As a result, the auxiliary battery 3 of the load is disconnected from the main battery 2, and the polarization of the main battery 2 is eliminated, so that the full charge capacity calculation unit 101 can calculate OCV with high accuracy. Note that the charge control unit 100 may open the relay 62 as a stopping means for power pumping out, or may stop the respective operations of the charging facility 90 and the power converter 40 when the connector 91 and the inlet 60 are connected.

The charge control unit 100 determines whether or not calculation of an estimated value of the full charge capacity is necessary by determining whether or not an error between the full charge capacity and the latest estimated value is larger than a predetermined value during execution of power pumping. At this time, the charge control unit 100 refers to the capacity DB 110 to calculate an error of the estimated value based on the usage time of the main battery 2. As described below, in the capacity DB 110, for example, correlations between the usage times and the capacity of the main battery 2 are registered as map data.

Figure 2:
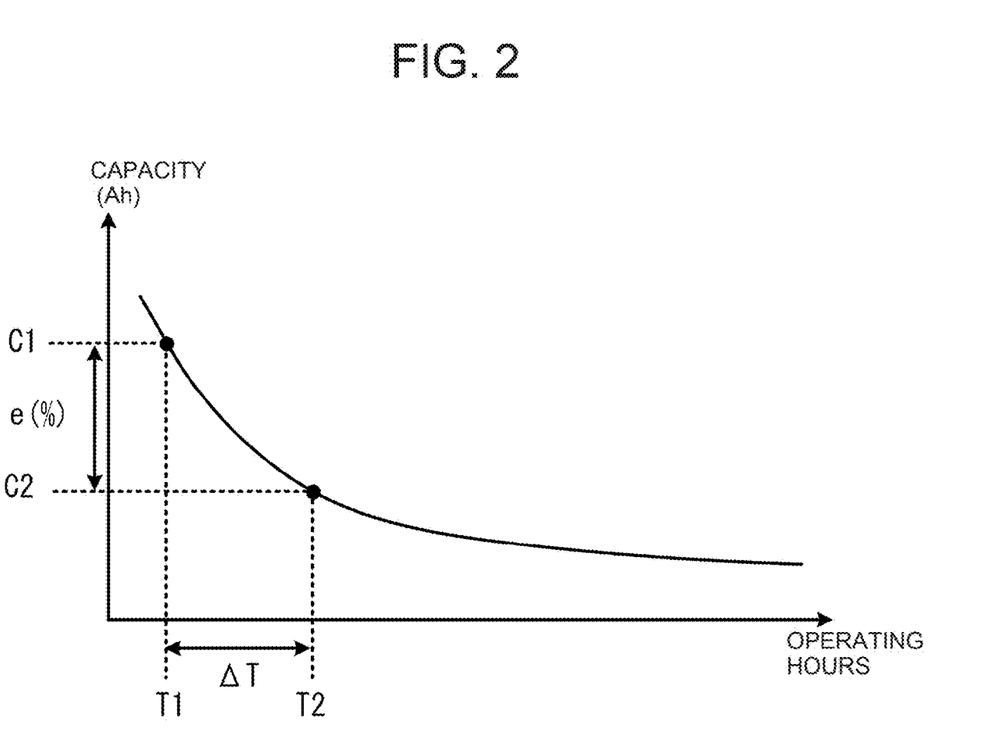
FIG. 2 is a diagram illustrating an example of correlation between usage time and capacity of a main battery.

FIG. 2 is a diagram illustrating an example of the correlation between the usage time and the capacity of the main battery 2. The capacity DB 110 is generated from a pre-experimental result or a simulated result. The capacity decreases to approach zero with the passage of time. The charge control unit 100 counts the use time of the main battery 2 by a timer or the like, and determines that the error is larger than the predetermined value when the use time when the error between the charge capacity and the latest estimated value reaches the predetermined value has elapsed.

For example, the most recent estimate calculated by the full-charge-capacity calculation unit 101 in the usage time T1 is referred to as C1 (Ah). In the monitoring of the deterioration state of the main battery 2, it is assumed that an error (hereinafter, referred to as an allowable error) allowed for the estimated value of the full charge capacity is e (%) ($0<e<100$). The allowable error corresponds to the predetermined value described above, and is determined in accordance with, for example, the specification of the main battery 2 or the requirement of the estimation accuracy.

The charge control unit 100 calculates a value C2(=C1−C1×e/100) decreased by an allowable error e from the estimated value C1. Next, based on the capacity DB 110, the charge control unit 100 calculates, from the capacity DB 110, the usage time T2 in which the capacity is C2. Further, the charge control unit 100 calculates the usage time T1 corresponding to C1 from the capacity DB 110, and calculates a time difference ΔT (=T2−T1) from the usage time T2. The charge control unit 100 determines that the error between the actual full charge capacity and the estimated value is larger than the predetermined value when the use time equal to or longer than the time difference ΔT has elapsed since the time when the estimated value C1 was finally calculated. When the use time equal to or more than the time difference ΔT has not elapsed, the charge control unit 100 determines that the error between the full charge capacity and the latest estimated value is equal to or less than the predetermined value.

As described above, the charge control unit 100 determines whether or not the error between the actual full charge capacity and the estimated value is larger than the predetermined value by using the elapsed time from the latest time at which the estimated value is calculated based on the correlation between the usage time of the main battery and the full charge capacity. Therefore, the charge control unit 100 can appropriately perform error determination based on the correlation between the use time and the capacity.

Note that the error determination is not limited to this, and may be performed on the basis of the travel distance of the vehicle V when the main battery 2 is used. In this case, the charge control unit 100 can determine that the error between the actual full charge capacity and the estimated value is larger than the predetermined value when the vehicle V is traveling beyond the distance corresponding to the allowable error from the travel distance when the estimated value is finally calculated at the time of parking. Further, for example, when the auxiliary battery 3 is replaced and various monitoring parameters are reset, the charge control unit 100 may consider that the error is larger than a predetermined value.

Referring again to FIG. 1, when determining that the error is larger than a predetermined value, the charge control unit 100 calculates a power supply duration and a required time (hereinafter, referred to as a polarization elimination time) for eliminating the polarization of the main battery 2. The power supply duration is a time during which the power supply of the auxiliary battery 3 to the auxiliary machine 51 continues while the power supply is stopped. When the power supply duration is equal to or longer than the depolarization time, the charge control unit 100 stops power pumping from the main battery 2 to the auxiliary battery 3. Accordingly, after the depolarization time has elapsed, the full charge capacity calculation unit 101 can calculate OCV with high accuracy substantially without being affected by the polarization.

As described above, the charge control unit 100 stops power pumping when the condition of the power supply duration≥the depolarization time is satisfied. On the other hand, when the power supply duration<the depolarization time is satisfied and the power pumping is stopped, there is a possibility that the power of the auxiliary battery 3 is insufficient before the depolarization and the auxiliary machine 51 becomes inoperable. Therefore, in this case, the charge control unit 100 continues without stopping the power pumping to the auxiliary battery 3. As described above, the charge control unit 100 can avoid an inappropriate stop of power pumping by determining the success or failure of the above-described condition of the depolarization time.

The charge control unit 100 calculates the power supply duration from, for example, SOC of the auxiliary battery 3 and the averaged power consumed by the auxiliary machine 51. At this time, the charge control unit 100 calculates SOC from the detected values of the voltage sensor 30, the current sensor 31, and the temperature sensor 32. The charge control unit 100 calculates the power that can be supplied by the auxiliary battery 3 from SOC, and calculates the power supply duration based on the averaged power consumed by the auxiliary machine 51.

The charge control unit 100 calculates the depolarization time based on the depolarization time DB 112, for example, from SOC and the temperature of the main battery 2. At this time, the charge control unit 100 acquires the temperature from the detected value of the temperature sensor 22, and calculates SOC from the detected values of the voltage sensor 20, the current sensor 21, and the temperature sensor 22. In addition, in the depolarization time DB 112, map data indicating correlations between SOC and the temperature of the main battery 2 and the depolarization time is registered on the basis of pre-experiments and simulations.

The full charge capacity calculation unit 101 calculates OCV of the main battery 2 after the depolarization time has elapsed from the time when the power pumping is stopped, and calculates an estimated full charge capacity from OCV by, for example, the following method.

$$FCC=100 \div (SOCe-SOCs) \times Is \quad (1)$$

The full-charge-capacity calculation unit 101 calculates the estimated-value FCC according to Equation (1) described above. In Expression (1), SOCs is SOC of the main battery 2 when the integration of the current value of the main battery 2 is started, and SOCe is SOC of the main battery 2 when the integration of the current value is ended. The full charge capacity calculation unit 101 calculates OCV from the detected value of the voltage sensor 20 while the power pumping is stopped, and calculates SOCs and SOCe based on SOC-DB 111 from OCV. In SOC-DB 111, map data indicating correlations between OCV and SOC of the main battery 2 is registered. After OCV is calculated, the charge control unit 100 resumes power pumping.

Further, the full charge capacity calculation unit 101 obtains the current integrated value Is by integrating the detected value of the current sensor 21. After calculating SOCs, when the current integrated value Is becomes larger than the threshold Ith, the full charge capacity calculation unit 101 calculates SOCe and calculates the estimated value FCC from Equation (1).

As described above, the charge control unit 100 determines whether or not the condition relating to the error of the estimated value of the full charge capacity and the condition relating to the depolarization time are satisfied during the execution of the power pumping, and stops the power pumping when each condition is satisfied. Therefore, ECU 1 can estimate the full charge capacity by calculating OCV with high accuracy without stopping the power pumping frequently. Therefore, ECU 1 can accurately monitor the degradation condition of the main battery 2.

Operation of ECU of the First Embodiment

Figure 3:
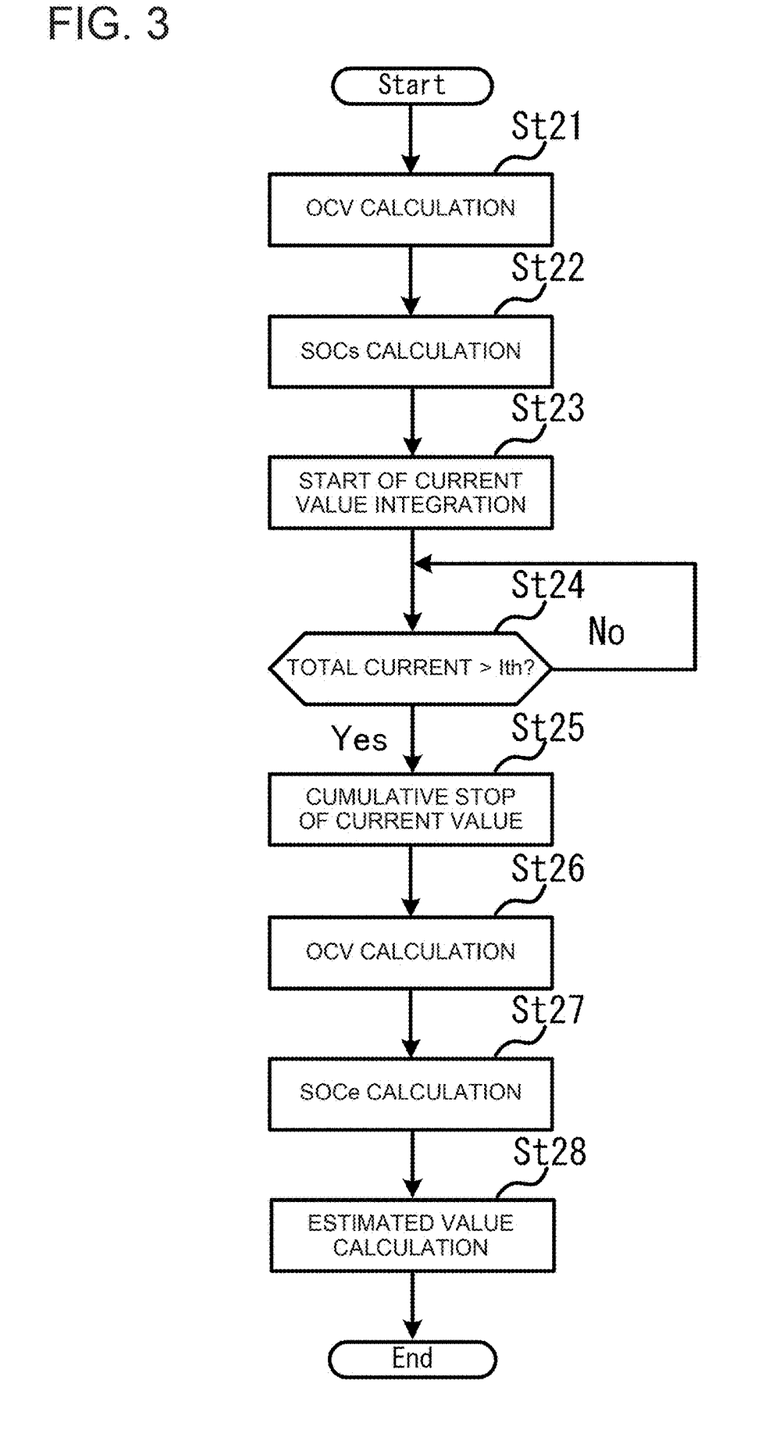
FIG. 3 is a flowchart illustrating an example of a process of calculating an estimated value of a full charge capacity.

FIG. 3 is a flowchart illustrating an example of a calculation process of an estimated value of a full charge capacity. In the present example, the calculation process using the above-described Expression (1) is exemplified as an example, but the present disclosure is not limited thereto. This process is executed while the charging control unit 100 performs power pumping at the time of stopping or parking the vehicle V.

First, the full charge capacity calculation unit 101 calculates OCV of the main battery 2 (St21). At this time, a OCV calculation process to be described later is executed. Next, the full charge capacity calculation unit 101 calculates SOCs based on SOC-DB 111 from OCV (St22).

Next, the full charge capacity calculation unit 101 starts integrating the current of the main battery 2 detected by the current sensor 21 (St23). Next, the full charge capacity calculation unit 101 compares the integrated current integrated value Is with the threshold Ith (St24). When Is≤Ith is satisfied (St24 is No), St24 process is executed again. When Is>Ith is satisfied (Yes of St24), the integration of the current is stopped (St25).

Next, the full charge capacity calculation unit 101 calculates OCV of the main battery 2 (St26). At this time, an OCV calculation process to be described later is executed. Next, the full charge capacity calculation unit 101 calculates SOCe based on SOC-DB 111 from OCV (St27).

Next, the full charge capacity calculation unit 101 calculates an estimated value from the current integrated value Is, SOCs and SOCe according to Expression (1) (St28). In this way, the calculation process of the estimated value of the full charge capacity is performed. Note that the full charge capacity calculation unit 101 stores the usage time of the main battery 2 (the above-described T1) when the estimated value is calculated, in a memory or the like.

Figure 4:
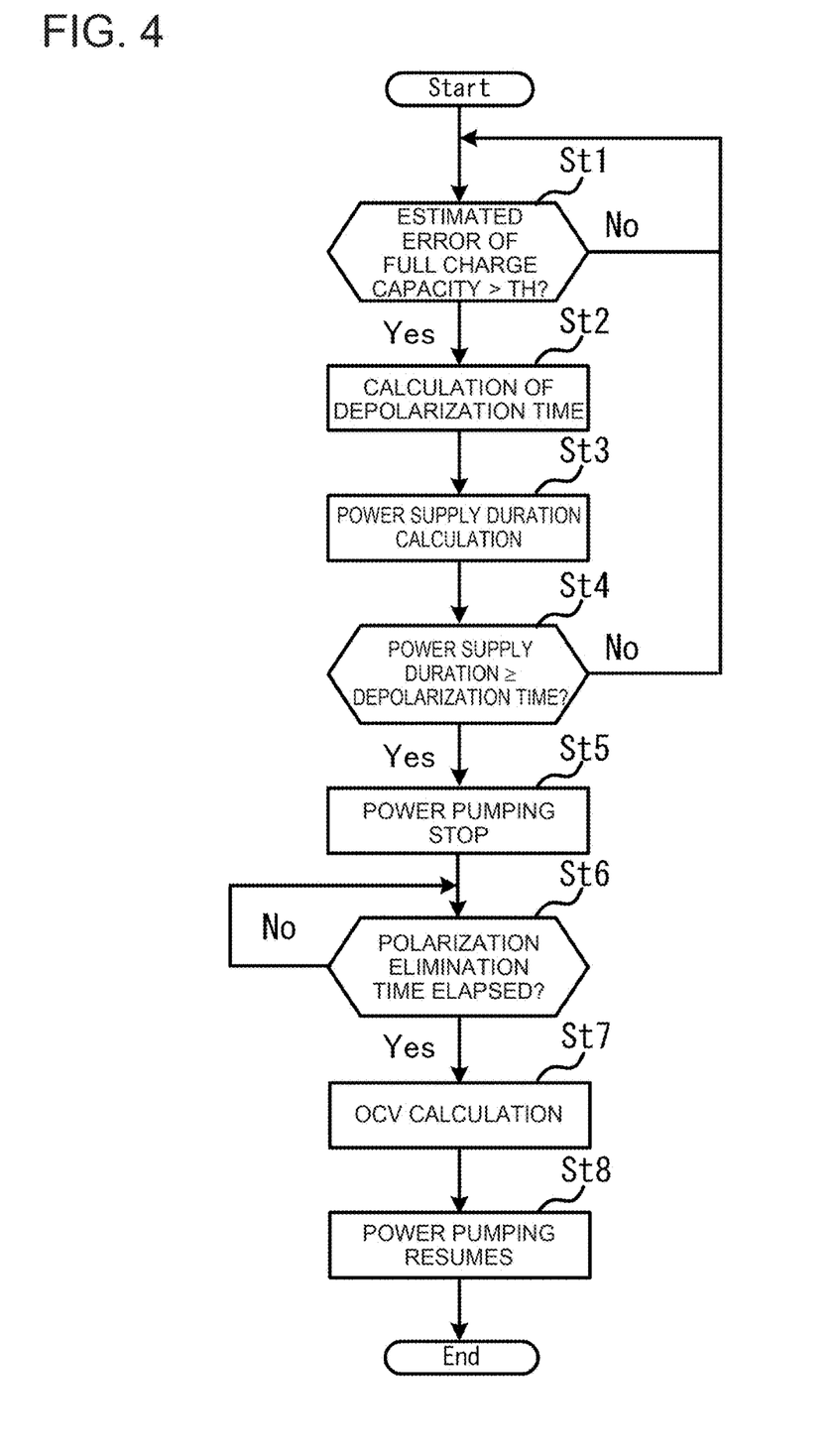
FIG. 4 is a flow chart illustrating an example of a process of calculating OCV of the main battery according to the first embodiment.

FIG. 4 is a flow chart illustrating an example of a process of calculating OCV of the main battery 2 according to the first example. This process is executed in the above-described St21 and St26, respectively.

First, the charge control unit 100 determines whether or not the error of the estimation of the full charge capacity is larger than the threshold TH (St1). The determination process includes, but is not limited to, a method using a capacity DB 110 as described above. When the error of the estimated value is equal to or less than the threshold TH (St1 in No), the charge control unit 100 determines that the latest estimated value has enough accuracy to detect degradation, and executes St1 process again.

When the error of the estimation value is larger than the threshold TH (Yes of St1), the charge control unit 100 calculates the depolarization time by the depolarization time DB 112 (St2). Then, the charge control unit 100 calculates the power supply duration of the auxiliary battery 3 during the stoppage of power pumping from SOC of the auxiliary battery 3, the mean power consumed by the auxiliary device, and the like (St3). The order of calculation of the depolarization time and the power supply duration is not limited.

Next, the charge control unit 100 compares the power supply duration with the depolarization time (St4). When the power supply duration<the depolarization time is satisfied (No of St4), the charge control unit 100 determines that there is a possibility that the power of the auxiliary battery 3 is insufficient due to the stoppage of the power pumping, and executes St1 process again.

When the power supply duration≥depolarization time is satisfied (Yes of St4), the charge control unit 100 determines that the power supply from the auxiliary battery 3 to the auxiliary machine 51 can be continued even during the stop of the power supply, and stops the power supply (St5). Note that the charge control unit 100 may fully charge the auxiliary battery 3 in advance so that the power supply duration≥the depolarization time is satisfied.

Next, the charge control unit 100 determines whether or not the depolarization period has elapsed from the time when the power pumping is stopped (St6). At this time, the charge control unit 100 measures the elapsed time from the stop of the power pumping by, for example, a timer, and uses it for the determination. When the depolarization period has not elapsed (No of St6), St6 process is performed again.

When the depolarization time has elapsed (Yes of St6), the full charge capacity calculation unit 101 determines that the depolarization of the main battery 2 has disappeared and calculates OCV (St7). This OCV is used to calculate SOCs and SOCe of Equation (1).

Next, the charge control unit 100 resumes power pumping (St8). In this way, the process of calculating OCV of the main battery 2 is executed.

System Configuration of the Second Embodiment

Figure 5:
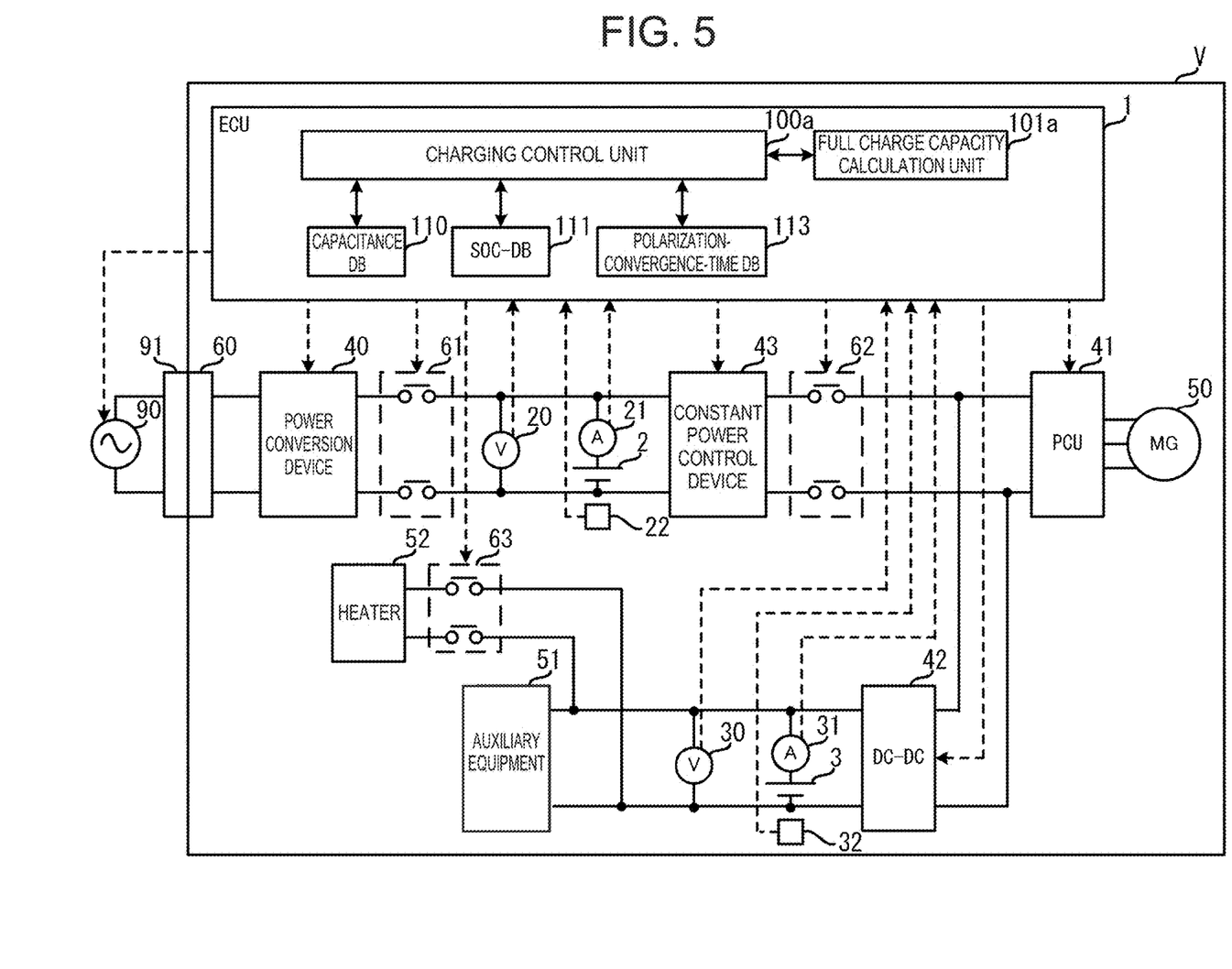
FIG. 5 is a block diagram illustrating an example of a vehicle according to a second embodiment.

FIG. 5 is a configuration diagram illustrating an example of a system of the vehicle V according to the second embodiment. In FIG. 5, the same components as those in FIG. 1 are denoted by the same reference numerals, and the description thereof will be omitted.

The vehicle V has a constant power control device 43 in addition to the same configuration as in the first embodiment. The constant power control device 43 has a circuit configuration similar to that of the stabilized power supply device, for example, and is connected between the main battery 2 and the relay 62, and maintains the supply power of the main battery 2 substantially constant. The operation of the constant power control device 43 is controlled by ECU 1.

ECU 1 has a charge control unit 100a and a full charge capacity calculation unit 101a as software-based functions. ECU 1 also includes a capacity DB 110, SOC-DB 111, such as non-volatile memories, and a polarization-convergence-time database 113.

The charge control unit 100a is an exemplary control unit and controls the power pumping. The full charge capacity calculation unit 101a is an exemplary calculation unit, and calculates an estimated full charge capacity from the open-circuit voltage (OCV) of the main battery 2 by the same method as described above.

In order to calculate OCV of the main battery 2, the charge control unit 100a limits the power pumping to a constant power (hereinafter, limited power) by operating the constant power control device 43 instead of stopping the power pumping. As a result, the supplied power is maintained at the limited power, and the polarization of the main battery 2 converges to a predetermined amount, so that the closed circuit voltage (CCV) of the main battery 2 can be calculated with high accuracy. OCV is calculated from CCV as described below.

The charge control unit 100a determines an error of the estimation of the full charge capacity as in the first embodiment. When an error between the full charge capacity and the estimated value is larger than a predetermined value, the charge control unit 100a calculates a power supply duration and a required time (hereinafter, referred to as a polarization-convergence time). The power supply duration is a time during which the power supply of the auxiliary battery 3 to the auxiliary machine 51 is sustained when the power pumping is limited to the limited power. The required time is a time for the polarization amount of the main battery 2 to converge to a predetermined amount due to the limitation of power pumping.

The charge control unit 100a calculates the power supply duration from, for example, SOC of the auxiliary battery 3, the limited power, and the averaged power consumed by the auxiliary machine 51. At this time, the charge control unit 100 calculates SOC from the detected values of the voltage sensor 30, the current sensor 31, and the temperature sensor 32.

The charge control unit 100a calculates the polarization convergence time based on the polarization convergence time DB 113, for example, from SOC and the temperature of the main battery 2. At this time, the charge control unit 100a acquires the temperature from the detected value of the temperature sensor 22, and calculates SOC from the detected values of the voltage sensor 20, the current sensor 21, and the temperature sensor 22. In addition, in the polarization convergence time DB 113, map data indicating correlations between SOC and the temperature of the main battery 2 and the polarization convergence time when the power pumping is limited to the limited power is registered on the basis of a previous experiment or simulation result.

The charge control unit 100a limits the power pumping to the limited power when the power supply duration≥the polarization convergence time is satisfied. On the other hand, when the power supply duration<the polarization convergence time is satisfied, if the power pumping is limited, there is a possibility that the power of the auxiliary battery 3 is insufficient before the polarization convergence and the auxiliary machine 51 becomes inoperable. Therefore, the charge control unit 100a does not limit the power pumping to the auxiliary battery 3. As described above, the charge control unit 100a determines whether or not the above-described polarization-convergence period is satisfied, thereby avoiding inappropriate limitation of power pumping.

The charge control unit 100a limits the power pumping to the limited power when the power supply duration is equal to or greater than the polarization-convergence time. As a result, after the polarization convergence period has elapsed, the full charge capacity calculation unit 101a can calculate CCV with high accuracy while the effect of the polarization is suppressed.

$$OCV = CCV - I \times r \quad (2)$$

For example, the full charge capacity calculation unit 101a calculates OCV from CCV, the current value I, and the inner resistance value r of the main battery 2 according to Expression (2) described above. The full charge capacity calculation unit 101a acquires the current value I from the current sensor 21, and calculates CCV from the detected value of the voltage sensor 20.

For example, the full charge capacity calculation unit 101a plots (I-V plots) the current value and the voltage value of the main battery 2 in the two-dimensional coordinate system for a predetermined period of time based on the detected values of the voltage sensor 20 and the current sensor 21 prior to the limit of the power pumping. Next, the full charge capacity calculation unit 101a linearly approximates the correlation between the current value and the voltage value, and calculates the inner resistance value r by acquiring the slope. The means for calculating the internal resistance value r is not limited to this. For example, the full charge capacity calculation unit 101a may calculate the internal resistance value r from the correlations with SOC and the temperature of the main battery 2 based on Arrhenius's law, or may calculate the internal resistance value r from the usage time of the main battery 2.

As described above, the full charge capacity calculation unit 101a calculates OCV from the inner resistance r and CCV of the main battery 2 after the polarization-convergence period elapses from the time when the power pumping is limited. Therefore, the full charge capacity calculation unit 101a can calculate OCV with higher accuracy than when calculating OCV from CCV using the map data, for example.

After OCV is calculated, the charge control unit 100a stops the operation of the constant power control device 43 to cancel the limitation of the power pumping. As a result, electric power corresponding to the power consumption of the auxiliary machine 51 as a load is charged from the main battery 2 to the auxiliary battery 3. Incidentally, although the power limit is not limited, when the power limit is larger than the mean power consumption of the auxiliary machine 51, the charge control unit 100a may drive the heaters 52 by closing the relays 63 to consume excess power.

As described above, the charge control unit 100a determines whether or not the condition relating to the error of the estimation value of the full charge capacity and the condition relating to the polarization convergence time are satisfied during the power pumping, and limits the power pumping to the limited power when the respective conditions are satisfied. Therefore, ECU 1 can estimate the full charge capacity by calculating OCV with high accuracy without frequently restricting the power pumping, and thus ECU 1 can monitor the degradation status of the main battery 2 with high accuracy.

Operation of ECU of the Second Embodiment

Also in the present embodiment, the calculation process of the estimation value of the full charge capacity is performed in the same manner as in the first embodiment. The calculation process of OCV of the main battery 2 will be described below.

Figure 6:
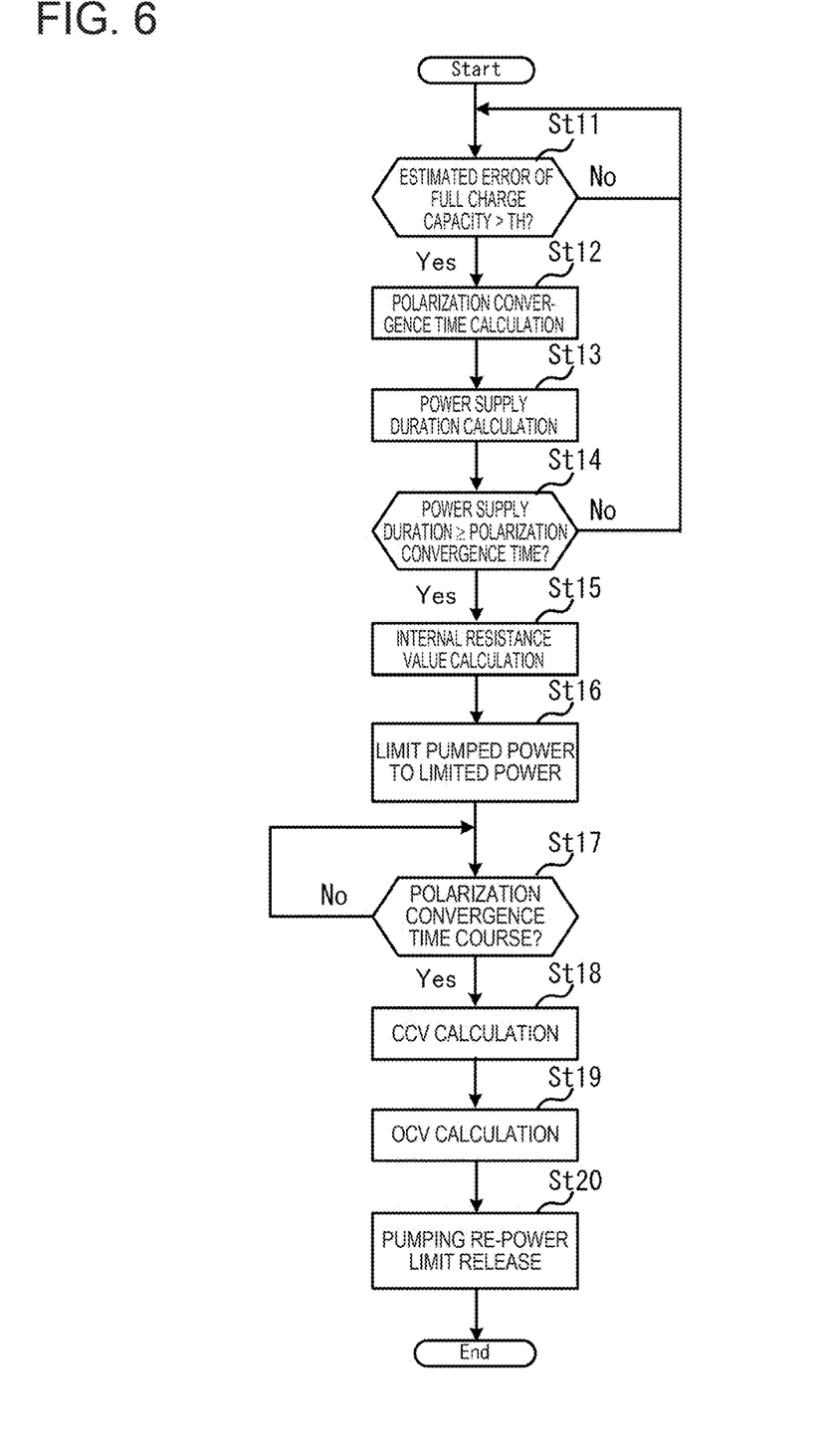
FIG. 6 is a flow chart illustrating an example of a process of calculating OCV of the main battery according to the second example.

FIG. 6 is a flow chart illustrating an example of a process of calculating OCV of the main battery 2 according to the second example. This process is executed in the above-described St21 and St26.

First, the charge control unit 100a determines whether or not the error of the estimation value of the full charge capacity is larger than the threshold TH (St11), as in the first embodiment. When the error of the estimated value is less than or equal to the threshold TH (No of St11), the charge control unit 100a determines that the latest estimated value has enough accuracy to detect degradation, and performs St11 process again.

In addition, when the error of the estimation value is larger than the threshold TH (Yes of St11), the charge control unit 100a calculates the polarization convergence time based on the polarization convergence time DB 113 (St12). Then, the charge control unit 100a calculates the power supply duration of the auxiliary battery 3 during the stoppage of power pumping from SOC of the auxiliary battery 3, the limited power, the averaged power consumed by the auxiliary device, and the like (St13). The order of calculation of the polarization convergence time and the power supply duration is not limited.

Next, the charge control unit 100a compares the power supply duration with the polarization-convergence time (St14). When the power supply duration<the polarization convergence time is satisfied (No of St14), the charge control unit 100a determines that there is a possibility that the power of the auxiliary battery 3 is insufficient due to the limitation of the power pumping, and executes St11 process again.

In addition, when the power supply duration≥the polarization convergence time is satisfied (Yes of St14), the charge control unit 100a determines that the power supply from the auxiliary battery 3 to the auxiliary machine 51 can be continued even in the limit of the power supply. Then, the charge control unit 100a calculates the inner resistance value r (St15), and limits the power pumping to the limited power by operating the constant power control device 43 (St16). Note that the charge control unit 100a may fully charge the auxiliary battery 3 in advance so that the power supply duration≥the polarization convergence time is satisfied.

Next, the charge control unit 100a determines whether or not the polarization-convergence period has elapsed from the time when the power pumping is limited (St17). At this time, the charge control unit 100a uses, for example, a timer to measure and determine the elapsed time from the stoppage of the power pumping. If the polarization-convergence period has not elapsed (No of St17), St17 process is performed again.

When the polarization convergence period has elapsed (Yes of St17), the full charge capacity calculation unit 101a determines that the polarization of the main battery 2 has disappeared, calculates CCV (St18), and calculates OCV from CCV and the inner resistance value r as described above (St19). This OCV is used to calculate SOCs and SOCe of Equation (1).

The charge control unit 100a then St20 the power pumping limitations. In this way, the process of calculating OCV of the main battery 2 is executed.

The embodiments described above are examples of preferred embodiments of the present disclosure. However, the present disclosure is not limited to this, and various modifications can be made without departing from the gist of the present disclosure.

What is claimed is:

1. A control device comprising:
a control unit that controls power supply from a main battery of a power source of a vehicle to a sub-battery that supplies power to a load mounted in the vehicle during parking; and
a calculation unit that calculates an estimated value of full charge capacity of the main battery from a voltage of the main battery, wherein
the control unit calculates a power supply duration during which the power supply of the sub-battery to the load is continued during stopping of the power supply and a time required to solve polarization of the main battery when an error between the full charge capacity and the estimated value is greater than a predetermined value, and stops the power supply when the power supply duration is equal to or greater than the required time,
the calculation unit calculates the voltage after the required time elapses after the power supply is stopped, and
the control unit restarts the power supply after the voltage is calculated.

2. A control device comprising:
a control unit that controls power supply from a main battery of a power source of a vehicle to a sub-battery that supplies power to a load mounted in the vehicle during parking; and
a calculation unit that calculates an estimated value of full charge capacity of the main battery from a voltage of the main battery, wherein
the control unit calculates a power supply duration during which the power supply of the sub-battery to the load is continued when the power supply is limited to specific power and a time required by an amount of polarization of the main battery to converge to a predetermined amount through the limitation of the power supply when an error between the full charge capacity and the estimated value is greater than a predetermined value, and limits the power supply to the specific power when the power supply duration is equal to or greater than the required time,
the calculation unit calculates the voltage after the required time elapses after the power supply is limited, and
the control unit releases the limitation of the power supply after the voltage is calculated.

3. The control device according to claim 1, wherein the control unit determines whether or not the error is greater than the predetermined value using an elapse time from a latest clock time at which the estimated value is calculated based on a correlation between a utilization time of the main battery and the full charge capacity.

4. The control device according to claim 2, wherein the control unit determines whether or not the error is greater than the predetermined value using an elapse time from a latest clock time at which the estimated value is calculated based on a correlation between a utilization time of the main battery and the full charge capacity.

5. The control device according to claim 2, wherein the calculation unit calculates the voltage from an internal resistance value and a closed circuit voltage of the main battery after the required time elapses after the power supply is limited.

6. The control device according to claim 1, wherein the load is a drive recorder that is mounted in the vehicle.

7. The control device according to claim 2, wherein the load is a drive recorder that is mounted in the vehicle.

\* \* \* \* \*